United States Patent
Vedhagiri et al.

(10) Patent No.: US 8,015,824 B2
(45) Date of Patent: Sep. 13, 2011

(54) METHOD AND SYSTEM FOR REGULATING A COOLING FLUID WITHIN A TURBOMACHINE IN REAL TIME

(75) Inventors: Sivaraman Vedhagiri, Greer, SC (US); Ravi Meenaksh, Greenville, SC (US); Jesse E. Trout, Simpsonville, SC (US); Jun Yang, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 982 days.

(21) Appl. No.: 11/799,161

(22) Filed: May 1, 2007

(65) Prior Publication Data

US 2008/0271459 A1    Nov. 6, 2008

(51) Int. Cl.
*F02C 6/08* (2006.01)

(52) U.S. Cl. ............. 60/782; 60/785; 60/39.83; 60/806; 60/795; 415/144

(58) Field of Classification Search .................... 60/782, 60/785, 39.83, 806, 795; 415/144
See application file for complete search history.

(56) References Cited

U.S. PATENT DOCUMENTS

| | | | | |
|---|---|---|---|---|
| 6,050,079 A | * | 4/2000 | Durgin et al. | 60/782 |
| 2007/0137213 A1 | * | 6/2007 | Rickert et al. | 60/782 |

\* cited by examiner

*Primary Examiner* — William Rodriguez
*Assistant Examiner* — Craig Kim
(74) *Attorney, Agent, or Firm* — Dale J. Davis; Ernest G. Cusick; Frank A. Landgraff

(57) ABSTRACT

A method and system for regulating a cooling fluid within a turbomachine in real time. The system may an external flow conditioning system for adjusting at least one property of the cooling fluid, wherein the external flow conditioning system comprises an inlet portion and an outlet portion. The system may also include at least one heat exchanger; at least one control valve; at least one bypass orifice; at least one stop valve; and a control system.

6 Claims, 2 Drawing Sheets

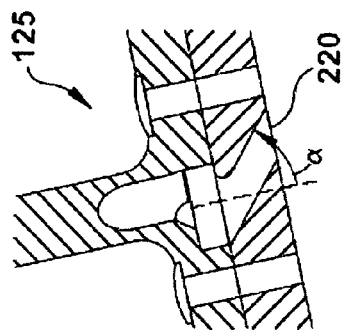
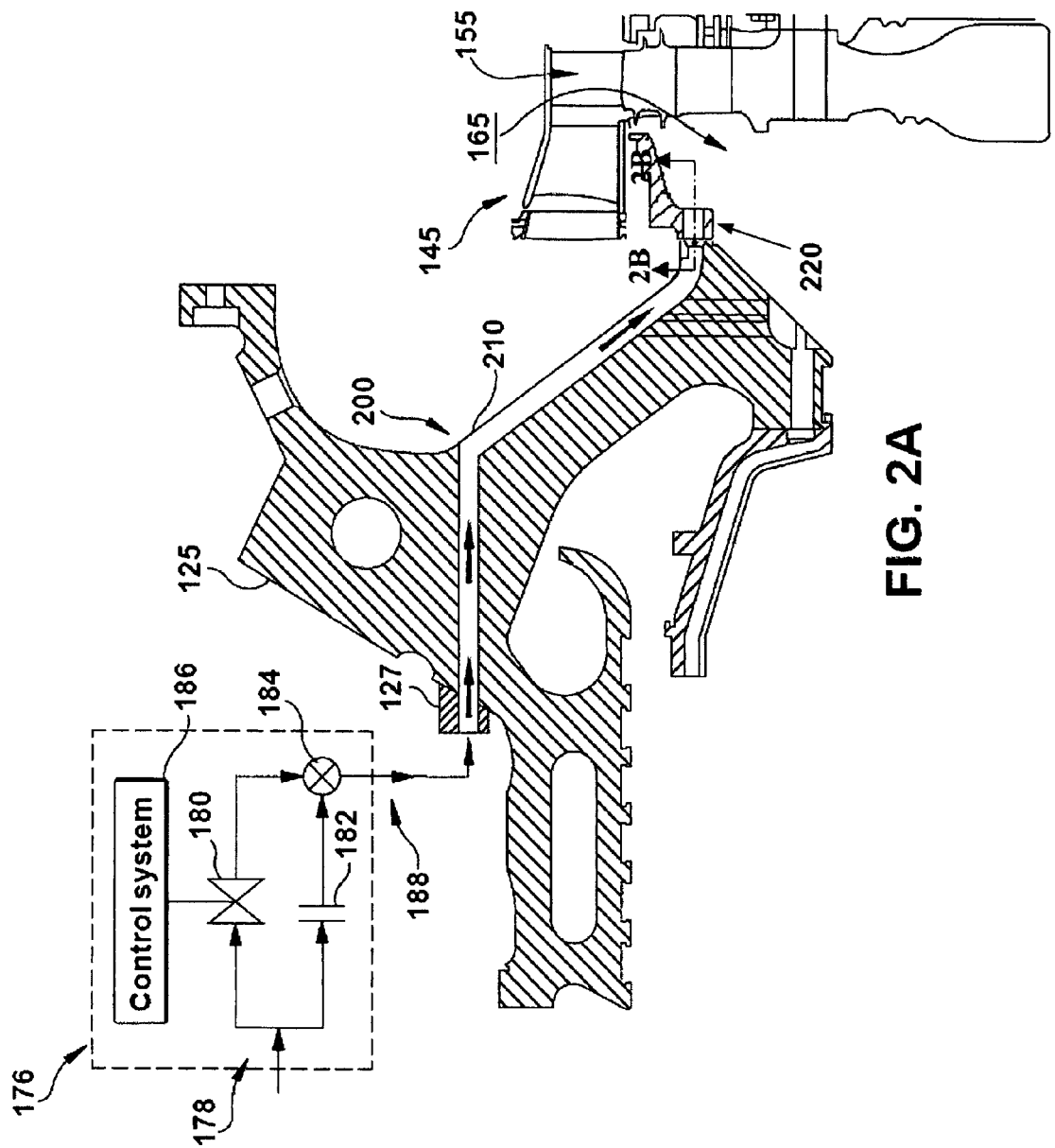
FIG. 2B
FIG. 2A

METHOD AND SYSTEM FOR REGULATING A COOLING FLUID WITHIN A TURBOMACHINE IN REAL TIME

BACKGROUND OF THE INVENTION

The present application relates generally to a cooling system on a turbomachine; and more particularly to, a system for and method of regulating a cooling fluid within a turbomachine.

In some turbomachines, such as gas turbines, a portion of the air compressed by the compressor is typically diverted from combustion to cool various stationary and rotating components or to purge cavities within a gas turbine. The diverted airflow (hereinafter "cooling fluid", or the like) consumes a considerable amount of the total airflow compressed by the compressor. The diverted cooling fluid is not combusted, and thus reduces the performance of the gas turbine. Regulating and controlling the cooling fluid can dramatically increase the performance of the turbine.

Typically, the cooling fluid is extracted from the compressor, bypasses the combustion system, and flows through a cooling circuit. The cooling circuit may run adjacent various turbine components including the turbine wheelspace areas. The cooling circuit is typically integrated with a seal system.

Relatively tight clearances may exist between the seal system components and the gas turbine rotor. Seal system wear may enlarge the seal system clearances. This wearing allows excess cooling fluid to flow downstream of the seal system; which reduces the overall efficiency of the gas turbine. The wear may be caused by a "trip" (an emergency shutdown of the turbomachine). Seals may also wear over time from gas turbine operation.

Some cooling circuits may include a plurality of internal chambers that direct the cooling fluid to a specific wheelspace area. Moreover, each of the internal chambers may include a plug, which prevents the cooling fluid from flowing into a specific wheelspace area. As the seal system wears the plugs may be removed or repositioned to reduce the cooling fluid flow downstream of the seals.

There are a few possible problems with the currently known cooling circuits. The unpredictable nature of the seal system wear does not allow for a deterministic flow of the cooling fluid through the cooling circuit. This typically leads to the general practice of over sizing the flow area within the cooling circuit; thereby allowing for excessive cooling fluid to flow and thus reducing the overall efficiency of the gas turbine. Gas turbines that incorporate plugs must be shutdown and disassembled before each plug may be removed or repositioned. The currently known systems may not allow for controlling the cooling fluid, while the gas turbine is in operation.

For the foregoing reasons, there is a need for a system that allows for regulating the cooling fluid passing into at least one wheelspace area of a gas turbine, while the gas turbine is in operation. The system should ensure adequate cooling of the at least one wheelspace area while improving the efficiency of the gas turbine. The system should also provide for a deterministic flow through the cooling circuit.

BRIEF DESCRIPTION OF THE INVENTION

In accordance with an embodiment of the present invention, a system for regulating a cooling fluid within a turbomachine, the turbomachine comprising a compressor section and at least one wheelspace area, the system comprising: an external flow conditioning system for adjusting at least one property of the cooling fluid, wherein the external flow conditioning system comprises an inlet portion and an outlet portion; and wherein the inlet portion receives a cooling fluid; a plurality of flow chambers, wherein each of the plurality of flow chambers comprises an angular section; wherein a portion of each of the plurality of flow chambers receives the cooling fluid from the outlet portion of the external flow conditioning system; wherein each of the plurality of flow chambers allows for the cooling fluid to pass to the at least one wheelspace area; and wherein the angular section directs the cooling fluid in a manner for pre-swirling the cooling fluid.

In accordance with an alternate embodiment of the present invention, a system for regulating a cooling fluid within a turbomachine, the turbomachine comprising a compressor section and at least one wheelspace area, the system comprising: at least one heat exchanger, wherein the at least one heat exchanger comprises: an upstream portion for receiving a cooling fluid from the at least one extraction port; and a downstream portion for allowing the cooling fluid to pass out of the at least one heat exchanger; an external flow conditioning system comprising: a inlet portion and an outlet portion; and wherein the inlet portion receives the cooling fluid from the at least one heat exchanger; at least one control valve; at least one bypass orifice; at least one stop valve; and a control system; and a plurality of flow chambers, wherein each of the plurality of flow chambers receives the cooling fluid from the outlet portion of the external flow conditioning system; wherein of each of the plurality of flow chambers comprises an angular section for directing the cooling fluid in a manner for pre-swirling the cooling fluid; and wherein each of the plurality of flow chambers allows for the cooling fluid to pass to the at least one wheelspace area of the turbomachine.

In accordance with an alternate embodiment of the present invention, a method of regulating a cooling fluid within a turbomachine, the turbomachine comprising a compressor section and at least one wheelspace area, the method comprising: providing an external flow conditioning system comprising: a inlet portion and an outlet portion; and wherein the inlet portion receives a cooling fluid; providing a plurality of flow chambers, wherein each of the plurality of flow chambers comprises an angular section; wherein a portion of each of the plurality of flow chambers receives the cooling fluid from the outlet portion of the external flow conditioning system; wherein each of the plurality of flow chambers allows for the cooling fluid to pass to the at least one wheelspace area; and wherein the angular section directs the cooling fluid in a manner for pre-swirling the cooling fluid; receiving a plurality of cooling fluid data, wherein the plurality of cooling fluid data comprises at least one wheelspace temperature; determining whether the cooling fluid data exceeds at least one range, wherein the at least one range comprises a wheelspace temperature; and if necessary, utilizing the external flow conditioning system to adjust the cooling fluid until the cooling fluid data is within the at least one range.

BRIEF DESCRIPTION OF THE DRAWING

FIGS. 2A and 2B, collectively FIG. 2, illustrate a schematic view, partly in cross section, of a portion of the gas turbine in accordance with an embodiment of the present invention.

DETAILED DESCRIPTION OF THE INVENTION

Figure 1:
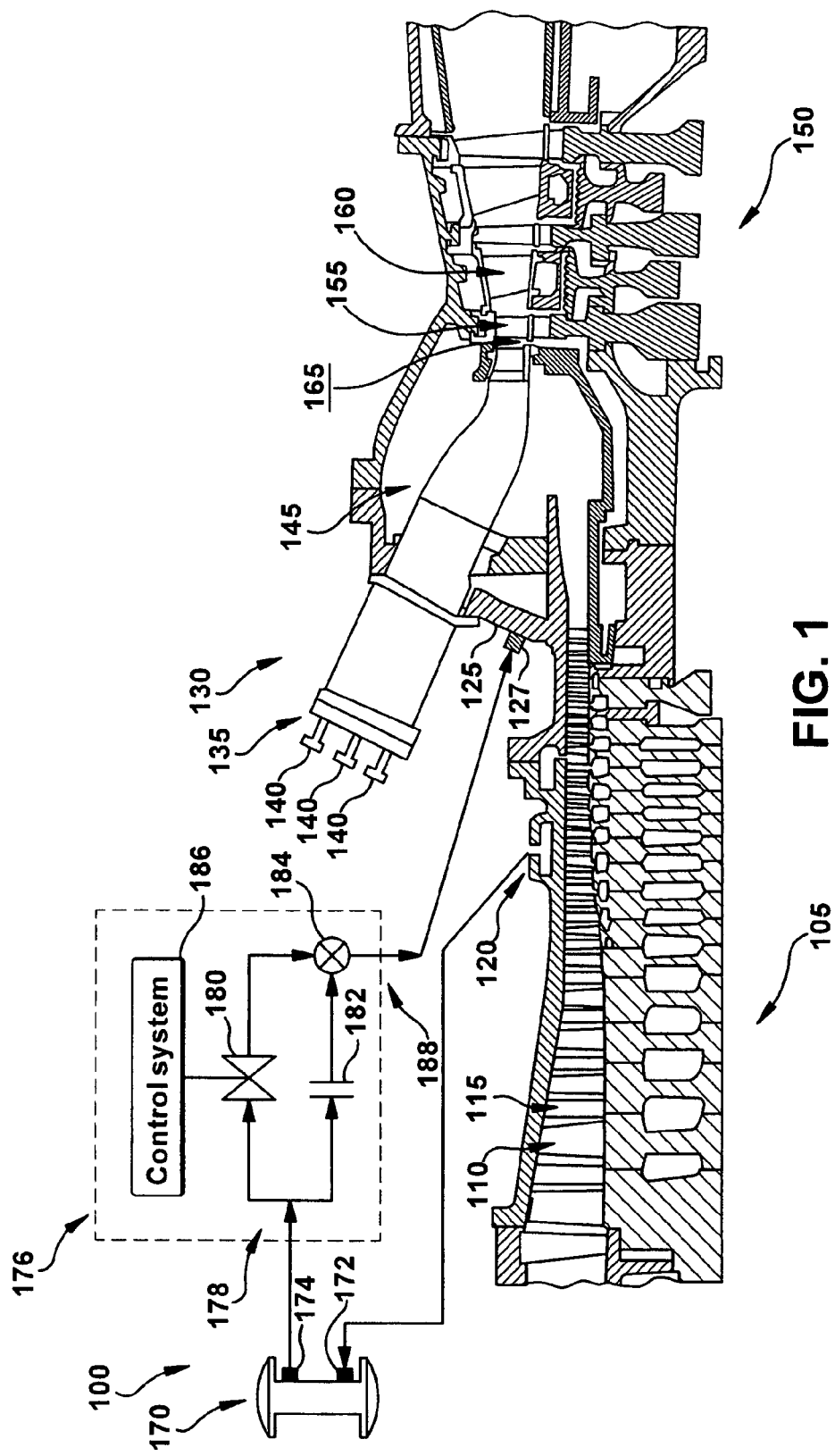
FIG. 1 is a schematic view, in cross-section, of a gas turbine, illustrating the environment in which an embodiment of the present invention operates.

Certain terminology is used herein for convenience only and is not to be taken as a limitation on the invention. For example, words such as "upper," "lower," "left," "front", "right," "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise.

Referring now to the Figures, where the various numbers represent like components throughout the several views, FIG. 1 is a schematic view, in cross-section, of a portion of a gas turbine, illustrating the environment in which an embodiment of the present invention operates. FIG. 1 also illustrates a schematic embodiment of a heat exchanger 170, and an embodiment of an external flow conditioning system 176. In FIG. 1, the gas turbine 100 includes: a compressor section 105; a combustion section 130; a turbine section 150; a heat exchanger 170; and a external flow conditioning system 176.

Generally, the compressor section 105 includes a plurality of rotating blades 110 and stationary vanes 115 structured to compress a fluid. The compressor section 105 may also include at least one extraction port 120; and a compressor discharge casing 125 that comprises a connection port 127.

Generally, the combustion section 130 includes a plurality of combustion cans 135 (only one is illustrated), a plurality of fuel nozzles 140, and a plurality of transition sections 145 (only one is illustrated). The plurality of combustion cans 135 may be coupled to a fuel source (not illustrated). Within each combustion can 135, compressed air is received from the compressor section 105 and mixed with fuel received from the fuel source. The air and fuel mixture is ignited and creates a working fluid. The working fluid generally proceeds from the aft end of the plurality of fuel nozzles 140 downstream through the transition section 145 into the turbine section 150.

Generally, the turbine section 150 includes a plurality of rotating components 155, a plurality of stationary components 160, and a plurality of wheelspace areas 165. Generally, the turbine section 150 converts the working fluid to a mechanical torque.

FIG. 1 also illustrates a heat exchanger 170. The heat exchanger 170 comprises an upstream port 172, which may be directly or indirectly connected to the extraction port 120. The heat exchanger 170 also comprises a downstream port 174, which may be directly or indirectly connected to the connection port 127 on the compressor discharge casing 125.

FIG. 1 also illustrates an external flow conditioning system 176. In am embodiment of the present invention the external flow conditioning system 176 comprises: an inlet portion 178; control valve 180; a bypass orifice 182; a stop valve 184; a control system 186; and an outlet portion 188.

Typically, during the operation of the gas turbine 100, a plurality of components experience high temperatures and may require cooling or purging. These components may include the plurality of wheelspace areas 165.

In an embodiment of the present invention, the extraction port 120 draws cooling fluid from the compressor section 105. The cooling fluid may then flow to the upstream port 172 of the heat exchanger 170. The heat exchanger 170 may alter the temperature of the cooling fluid. Next, the inlet portion 178, of the external flow conditioning system 176, may receive the cooling fluid from the downstream port 174 of the heat exchanger 170. The control system 186, of the external flow conditioning system 176, may adjust the flow of the cooling fluid by controlling the stroke of the control valve 180 and the stroke of the stop valve 184. The cooling fluid may then pass through the outlet portion 188, of the external flow conditioning system 176, and next enter the compressor discharge casing 125 via the connection port 127, thereafter the cooling fluid may flow through a cooling circuit (illustrated in FIG. 2A) for cooling or purging various components including at least one of the plurality of wheelspace areas 165.

Referring now to FIGS. 2A and 2B, collectively FIG. 2, which illustrate a schematic view, partly in cross section, of a portion of the gas turbine in accordance with an embodiment of the present invention.

FIG. 2A illustrates an example, but not limiting of, an embodiment of the present invention comprising an internal cooling circuit 200. The flow path of the internal cooling circuit 200 may start at the connection port 127, flow through a portion of the compressor discharge casing 125, and then flow to the wheelspace area 165.

In accordance with an embodiment of the present invention, the internal cooling circuit 200 may include a plurality of cooling chambers 210, wherein each of plurality of cooling chambers 210 comprises at least one angular section 220.

Each of the plurality of cooling chambers 210 may extend through a portion of the compressor discharge casing 125. Each of the plurality of cooling chambers 210 may be of any shape that allows for the desired cooling flow characteristics. Furthermore, each of the plurality of cooling chambers 210 may comprise any shape allowing for a cost effective forming method of the cooling chambers 210 within the gas turbine 100.

In an embodiment of the present invention, a portion of the plurality of cooling chambers 210 may be located on the upper half of the compressor discharge casing 125; and a portion of the plurality of cooling chambers 210 may be located on the lower half of the compressor discharge casing 125.

Each of the plurality of cooling chambers 210 may also include at least one angular section 220. The angular section 220 may comprise the portion of the cooling chamber 210 adjacent the at least one of the plurality of wheelspace areas 165.

Referring now to FIG. 2B, which illustrates a sectional view of the angular section 220 along line 2B-2B. The angular section 220 may include an angle α measured relative to the axis of rotation of the gas turbine rotor (not illustrated). The angular section 220 may alter the flow path of the internal cooling circuit 200 to create a pre-swirl of the cooling fluid possibly entering the at least one of the plurality of wheelspace areas 165. The magnitude of the angle α may be configured to increase the efficiency of the gas turbine 100.

In use, in an embodiment of the present invention, the upstream port 172 of the heat exchanger 170 may receive the cooling fluid from the compressor section 105 via the extraction port 120. Here, the upstream port 172 may be, directly or indirectly, connected to the connection port 127. Next, the heat exchanger may adjust the temperature of the cooling fluid to a specified range. The present invention may allow the user to set or alter the specified range. The cooling fluid may then exit the heat exchanger 170 via the downstream port 174, eventually flowing to the inlet portion 178 of external flow conditioning system 176. The downstream port 174 may be directly or indirectly connected to the inlet portion 178.

A portion of the cooling fluid entering the external flow conditioning system 176 may flow through at least one control valve 180 or the bypass orifice 182. The control system 186 may determine the amount of the cooling fluid flowing through the at least one control valve 180. The control system 186 may receive a plurality of cooling fluid data. The cooling fluid data may include, for example, but not limiting of, at least one wheelspace temperature data. Moreover, the control system 186 may receive the cooling fluid data from a variety of sources. These source may include for example, but not limiting of, feedback from at least one temperature element such as a wheelspace thermocouple; or another control system, such as the primary turbine control system, or the like.

Next, the control system 186 may determine whether or not the received cooling fluid data, such as, for example, but not limiting of, the temperature within the plurality of wheelspace areas 165, is within at least one specified range. If the cooling fluid data exceeds the at least one specified range, the control system 186 may increase the stroke of the at least one control valve 180 to increase the amount of the cooling fluid flowing to the plurality of wheelspace areas 165. Thereafter, the control system 186 may monitor the plurality of wheelspace areas 165 to determine whether or not an additional adjustment in the amount of cooling fluid flowing to the plurality of wheelspace areas 165 is required. Moreover, to reduce the potential for thermal transients 165, the control system 186 may adjust the stroke of the at least one stop valve 184 while adjusting the stroke of the at least one control valve 180.

After the external flow conditioning system 176 adjusts the cooling fluid, the cooling fluid may flow to the compressor discharge casing 125, via the outlet portion 188. The outlet portion 188 may be located relatively downstream of the stop valve 184; and may be connected, directly or indirectly, to the connection port 127. The cooling fluid may then flow through the connection port 127 to the cooling circuit 200, as previously described. Next, the cooling fluid may engage the plurality of wheelspace areas 165, as also previously described.

The present invention allows the user the flexibility of adjusting the amount of cooling fluid extracted from the compressor section 105, while the gas turbine 100 is in operation. The aforementioned features may allow a user to maximize the performance and efficiency of the gas turbine 100 by compensating for the wear of the seal system components (not illustrated). The external flow conditioning system 176 allows a user to adjust the cooling fluid properties, such as temperature and flow rate, in real time. The aforementioned features may provide for a near deterministic flow through the internal cooling circuit 200.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for regulating a cooling fluid within a turbomachine, the turbomachine comprising a compressor section and at least one wheelspace area, the system comprising:
   a cooling circuit comprising:
      a heat exchanging system comprising: an upstream port that is connected to an extraction port on compressor section, wherein a cooling fluid comprising air exits the compressor section via the extraction port and enters the heat exchanger; and a downstream port; wherein the heat exchanger receives the cooling fluid at a first temperature and discharges the cooling fluid at a second temperature;
      an external flow conditioning system comprising:
         an inlet portion connected to the downstream port of the heat exchanger; wherein an upstream end of the inlet portion receives the cooling fluid from the heat exchanger via the downstream port;
         a branch connection comprising: a first section comprising an upstream end connected to a downstream end of the inlet portion; a second section comprising an upstream end connected to a first downstream end of the first section, and a control valve that modulates the cooling fluid flowing through the branch connection; and a third section comprising an upstream end connected to a second downstream end of the first section, and a bypass orifice that adjusts flow properties of the cooling fluid; and a stop valve comprising an upstream end connected to downstream ends of the second section and the third section: and
         an outlet portion comprising upstream end that connected to a discharge end of the stop valve, and a downstream end connected to a connection port located on a compressor discharge casing of the turbomachine;
      a plurality of flow chambers integrated with the compressor discharge casing, wherein an upstream end of each of the plurality of flow chambers is connected to the connection port in an arrangement that non-cooling fluid flows downstream through the compressor as the cooling fluid, received from the connection port, flows through the plurality of flow chambers; wherein each of the plurality of flow chambers is fastened to the compressor discharge casing in a manner that creates a cavity between an aft end of each of the plurality of flow chambers and a downstream area of the compressor discharge casing;
      an angular section located on an aft end of the plurality of flow chambers and positioned adjacent to the cavity; wherein the angular section comprises an angle measured relative to the axis of rotation of a plurality of rotating components within the turbine section; and the angular section comprises surfaces that pre-swirls the cooling fluid that exits the plurality of flow chambers and enters the wheelspace areas, wherein an angle of the angular section comprises a range of from about 30 degrees to about 70 degrees.

2. The system of claim 1, wherein the angular section comprises a length of from about 1 inch to about 1.5 inches.

3. The system of claim 1 further comprising a control system which receives a plurality of cooling fluid data related to the turbomachine operation, wherein the plurality of cooling fluid data comprises at least one wheelspace temperature.

4. The system of claim 1, wherein the control system controls the stroke of the at least one control valve.

5. The system of claim 1, wherein the control system controls the stroke of the at least one stop valve.

6. A method of regulating a cooling fluid within a turbomachine, the method comprising:
   providing the turbomachine comprising a compressor section and at least one wheelspace area;
   providing a cooling circuit comprising:
      a heat exchanging system comprising: an upstream port that is connected to an extraction port on compressor section, wherein a cooling fluid comprising air exits the compressor section via the extraction port and enters the heat exchanger; and a downstream port; wherein the heat exchanger receives the cooling fluid at a first temperature and discharges the cooling fluid at a second temperature;

an external flow conditioning system comprising:
  an inlet portion connected to the downstream port of the heat exchanger; wherein an upstream end of the inlet portion receives the cooling fluid from the heat exchanger via the downstream port;
  a branch connection comprising: a first section comprising an upstream end connected to a downstream end of the inlet portion; a second section comprising an upstream end connected to a first downstream end of the first section, and a control valve that modulates the cooling fluid flowing through the branch connection; and a third section comprising an upstream end connected to a second downstream end of the first section, and a bypass orifice that adjusts flow properties of the cooling fluid; and a stop valve comprising an upstream end connected to downstream ends of the second section and the third section: and
  an outlet portion comprising upstream end that connected to a discharge end of the stop valve, and a downstream end connected to a connection port located on a compressor discharge casing of the turbomachine;
a plurality of flow chambers integrated with the compressor discharge casing, wherein an upstream end of each of the plurality of flow chambers is connected to the connection port in an arrangement that non-cooling fluid flows downstream through the compressor as the cooling fluid, received from the connection port, flows through the plurality of flow chambers; wherein each of the plurality of flow chambers is fastened to the compressor discharge casing in a manner that creates a cavity between an aft end of each of the plurality of flow chambers and a downstream area of the compressor discharge casing;
an angular section located on an aft end of the plurality of flow chambers and positioned adjacent to the cavity; wherein the angular section comprises an angle measured relative to the axis of rotation of a plurality of rotating components within the turbine section; and the angular section comprises surfaces that pre-swirls the cooling fluid that exits the plurality of flow chambers and enters the wheelspace areas, wherein an angle of the angular section comprises a range of from about 30 degrees to about 70 degrees;
receiving a plurality of cooling fluid data, wherein the plurality of cooling fluid data comprises at least one wheelspace temperature;
determining whether the cooling fluid data exceeds at least one range, wherein the at least one range comprises a wheelspace temperature; and
utilizing the external flow conditioning system to adjust physical properties of the cooling fluid until the cooling fluid data is within the at least one range.

* * * * *